United States Patent [19]

Danley et al.

[11] 4,330,697
[45] May 18, 1982

[54] DRIVE MOTOR ASSEMBLY FOR USE IN A MICROWAVE OVEN

[75] Inventors: Allen M. Danley, Eagan, Minn.; Albert E. Colato, Valencia, Calif.

[73] Assignee: Plastics, Inc., St. Paul, Minn.

[21] Appl. No.: 131,507

[22] Filed: Mar. 18, 1980

[51] Int. Cl.³ .............................................. H05B 9/06
[52] U.S. Cl. ............................... 219/10.55 F; 310/43; 310/83; 310/89
[58] Field of Search ................. 219/10.55 R, 10.55 D, 219/10.55 F; 310/43, 89, 83

[56] References Cited

U.S. PATENT DOCUMENTS

| | | | |
|---|---|---|---|
| 4,156,829 | 5/1979 | Harada | 219/10.55 D |
| 4,210,794 | 7/1980 | Oguri | 219/10.55 F |
| 4,219,715 | 8/1980 | Mandle et al. | 219/10.55 F |

*Primary Examiner*—Donovan F. Duggan
*Attorney, Agent, or Firm*—Flehr, Hohbach, Test, Albritton & Herbert

[57] ABSTRACT

Drive motor assembly for use with a turntable, rotisserie or other appliance in a microwave oven. The motor assembly is self-contained and can be used interchangeably with different appliances. It can be positioned in a corner of the oven cavity where it will not interfere appreciably with the distribution of microwave energy within the cavity.

12 Claims, 5 Drawing Figures

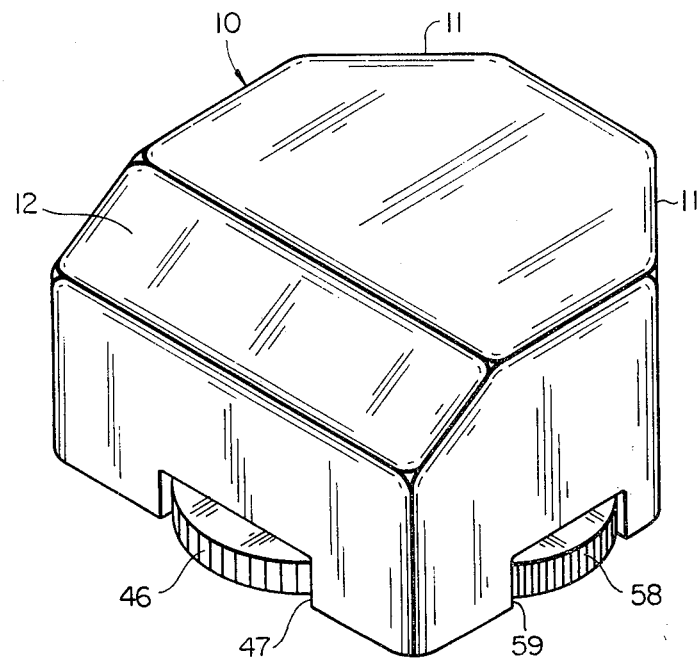
FIG_1
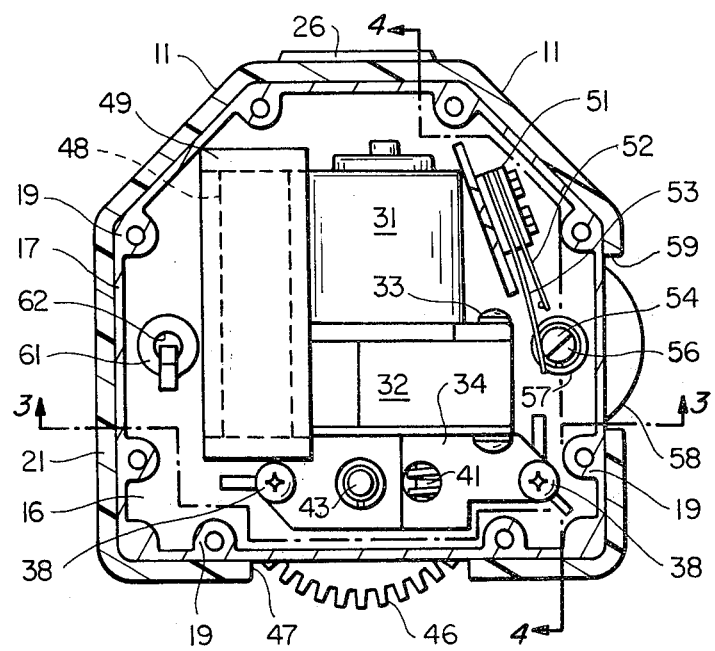
FIG_2

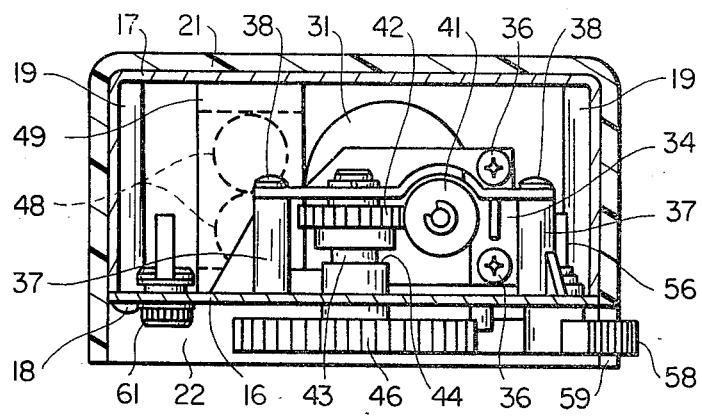
FIG_3
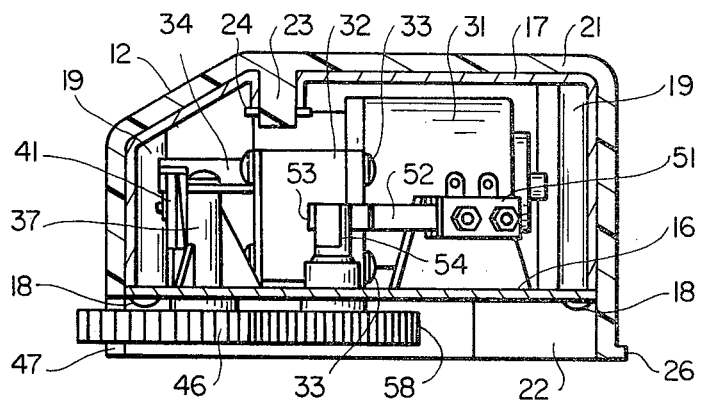
FIG_4
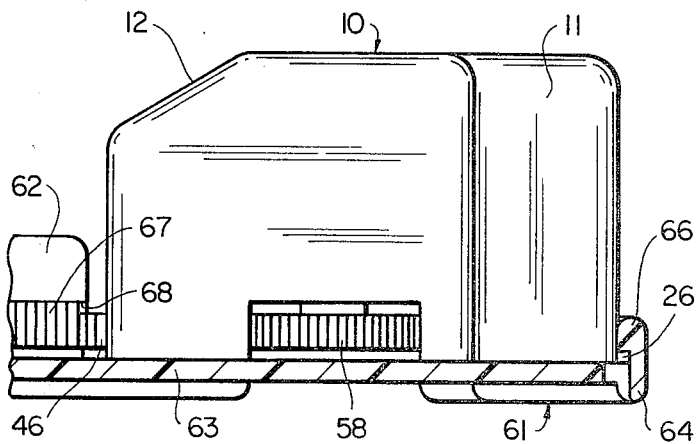
FIG_5

DRIVE MOTOR ASSEMBLY FOR USE IN A MICROWAVE OVEN

This invention pertains generally to microwave heating and cooking apparatus and more particularly to a drive motor assembly for use with a turntable, rotisserie or other appliance in a microwave oven.

Because of the non-uniform distribution of microwave energy within the cavity of a microwave oven, the food or other material being heated is frequently turned or moved about in the oven cavity to provide more uniform heating or cooking. While some microwave ovens have built-in turntables for this purpose, many others do not, and portable turntables are now available for use in ovens which do not have built in turntables. One such portable turntable is described in Application No. 131,505, filed of even date. A portable rotisserie for use in microwave ovens is described in Application No. 47,013, filed June 11, 1979. These portable appliances require their own drive motor assemblies if they are to operate independently of the oven and avoid any breeching of the walls defining the oven cavity.

It is in general an object of the invention to provide a new and improved drive motor assembly for use in a microwave oven.

Another object of the invention is to provide a drive motor assembly of the above character which can be used interchangeably for driving different appliances such as a turntable and a rotisserie in a microwave oven.

Another object of the invention is to provide a drive motor assembly of the above character which can be placed in the oven cavity without interfering appreciably with the distribution of microwave energy therein.

These and other objects are achieved in accordance with the invention by providing a drive motor assembly having a housing reflective to microwave energy defining a microwave-tight enclosure. A drive motor is enclosed within the housing and connected to an output shaft which extends through a microwave attenuating passageway in one wall of the housing. An output member is mounted on the shaft outside the housing for driving engagement with a movable portion of an appliance on which the motor assembly is mounted. The assembly is substantially smaller than the oven cavity and can be placed in the cavity without interfering appreciably with the distribution of microwave energy therein.

FIG. 1 is an isometric view of one embodiment of a drive motor assembly according to the invention.

FIG. 2 is a horizontal sectional view of the drive motor assembly of FIG. 1.

FIG. 3 is a cross-sectional view taken along line 3—3 of FIG. 2.

FIG. 4 is a cross-sectional view taken along line 4—4 of FIG. 2.

FIG. 5 is a fragmentary side elevational view of the drive motor assembly of FIG. 1 mounted on a turntable for use in a microwave oven.

As illustrated in the drawings, the drive motor assembly includes a housing 10 which is generally rectangular in plan view. The vertically extending rear corners 11 of the housing are bevelled to facilitate placement of the motor assembly in the corner of a rectangular oven cavity. The housing has a low vertical profile to avoid interference with the rotation of objects carried by the turntable or other appliance with which the assembly is employed, and the upper front corner 12 of the housing is bevelled in order to provide additional clearance for the rotating objects.

The housing comprises a base plate 16 and a cover 17, each of which is fabricated of a material, such as metal, which is reflective to microwaves. The base plate and cover are secured together by screws 18 to provide a microwave-tight shielding enclosure. The screws extend through holes (not shown) in the base plate and are threadedly received in elongated bosses 19 in the cover.

The outer surface of cover 17 is covered by a rigid shell 21 of electrically insulative material, which reduces arcing to the metallic shield. The lower portion of shell 21 extends beyond base plate 16 and forms a recessed area 22 beneath the base plate. The shell fits closely over cover 17 and is affixed thereto by a post 23 and a lock washer 24. A flange 26 projects rearwardly from the lower portion of the rear wall of shell 21 and, as discussed more fully hereinafter, provides means for securing the drive motor assembly to an appliance. Shell 21 is fabricated of a material which is compatible for use with microwave energy, i.e. a material having a low dielectric constant (e.g., 4 or less) or a low loss tangent at microwave frequencies. In one presently preferred embodiment, the shell is fabricated of a modified thermoset polyester as used in MICROWARE cookware developed by Plastics, Inc., a subsidiary of Anchor Hocking Corporation. This material has a low loss tangent at microwave frequencies and can withstand prolonged exposure to temperatures of approximately 500° F. This material is suitable for use in either a microwave oven or a conventional oven. If the motor assembly is not going to be used in conventional ovens, the insulative material does not need to have a particularly high temperature resistance, and suitable materials for microwave use only includes polysulfone, thermoplastic polyesters, polypropylene, polycarbonate, polystyrene, acrylonitrile, butadiene, styrene, polyphenylene oxide, acrylic, and polyethylene.

The drive motor assembly also includes an electrically energized motor 31 and a speed reducing transmission 32 which are mounted inside housing 10. The drive motor and transmission are secured together by screws 33 and affixed to a mounting bracket 34 by screws 36. The mounting bracket is mounted on upright posts 37 on base plate 16 and secured thereto by screws 38. A worm 41 is affixed to the output shaft of transmission 32 and drives a worm gear 42 on an output shaft 43. This output shaft is rotatively mounted between mounting bracket 34 and base plate 16 and extends through a microwave attenuating passageway 44 in the base plate. An output gear 46 is mounted on the shaft below plate 16 outside the shielding enclosure. Shaft 43 and output gear 46 are fabricated of a microwave compatible material such as polycarbonate or polyphenylene sulfide, and the output gear projects through an aperture 47 in outer shell 21.

In one presently preferred embodiment, drive motor 31 is a DC motor having an operating speed on the order of 1500 RPM. This motor includes a built-in transmission 32 having a gear ratio of 34:1, and transmission of worm and worm gear provides an additional speed reduction of 10:1.

Operating power for the drive motor is provided by batteries 48 which are mounted inside housing 10 adjacent to the drive motor and transmission. The batteries are wrapped in a layer of foam 49 which serves to cushion the batteries and retain them in position between the base plate and cover of the housing. The delivery of current from the batteries to the motor is controlled by an on/off switch 51 having contact arms 52, 53. This switch also includes a cam 54 formed at the upper end of a rotatively mounted shaft 56 in position to bear against contact arm 53 whereby the contacts can be separated. Shaft 56 extends through a microwave attenuating passageway 57 in base 16 of the drive motor housing. A thumbwheel or operating knob 58 is affixed to shaft 56 below bottom plate 16 and projects through an aperture 59 in the side wall of outer shell 21. Since thumbwheel 58 and a portion of shaft 56 are positioned outside the shielding enclosure, these two elements are made of a microwave compatible material.

Power for charging the batteries is supplied by a charger (not shown) through a jack 61 mounted on the base plate of the motor housing. The plug opening 62 of the jack is sufficiently small that it will not propagate microwave energy of the wavelength commonly utilized in microwave ovens. In the preferred embodiment, jack 61 is a closed circuit jack which interrupts the circuit between the batteries and the motor when the charger plug is inserted in the jack. The wiring of the batteries, motor, switch and jack is conventional and has been omitted from the drawings for ease of illustration.

The drive motor assembly can be employed with different appliances such as a turntable or a rotisserie, and it can be used interchangeably with these appliances. In FIG. 5, the motor assembly is illustrated in connection with a turntable of the type disclosed in Application No. 131,505, filed of even date. The turntable includes a generally planar base 61 adapted to rest on the floor of the oven cavity, with a horizontally extending platform 62 rotatively mounted on the base. The base has a flange portion 63 which extends outwardly from one side of the platform for receiving the drive motor assembly. The flange portion has an upstanding peripheral rim 64 which serves to retain the drive motor assembly laterally in position on the base. The rim includes a horizontally extending flange or lip 66 which interlocks with flange 26 to retain the motor assembly down against the base. Platform 62 has a peripheral ring of outwardly facing gear teeth 67 which mesh with the teeth of motor assembly output gear 46. An outwardly projecting shoulder 68 is formed on the skirt of the platform above gear teeth 67 and interlocks with output gear 46 to further retain the motor assembly on the base.

The drive motor assembly can be mounted in any desired position, depending upon the appliance with which it is utilized. With a rotisserie of the type disclosed in Application No. 47,013, filed June 11, 1979, for example, the motor assembly is mounted in a vertical position and retained in a pocket formed by flanges on the base of the rotisserie.

The drive motor assembly is substantially smaller than the cavity of a microwave oven. In the embodiment illustrated, the motor assembly is approximately 3½ inches wide, 3½ inches deep, and 1⅞ inches high. The cavity of a typical microwave oven might, for example, be 14 inches wide, 16 inches deep, and 9 inches high. The motor assembly is readily positioned in a corner of the oven cavity where it will not interfere appreciably with the distribution of microwave energy within the cavity.

Operation and use of the drive motor assembly is as follows. The assembly is mounted on an appliance, with output gear 46 in driving engagement with the moving portion of the appliance, e.g. the rotatable platform of a turntable. The appliance is placed in the cavity of the microwave oven, with the motor assembly in a position where it will not interfere appreciably with the distribution of microwave energy within the cavity. The motor is turned on rotating the thumbwheel or operating knob of switch 151 to complete the circuit between the batteries and the drive motor.

The invention has a number of important features and advantages. It provides a compact, rugged drive motor assembly for use with turntables, rotisseries and other appliances in microwave ovens. It is self-contained and can be used interchangeably with different appliances. It is of relatively small size and can be positioned in a corner or other portion of the oven cavity where it will not interfere appreciably with the distribution of microwave energy. The shielding enclosure is sealed, and spilled food is not likely to enter the housing. Moreover, the assembly can be readily removed from the appliance for cleaning, if necessary.

It is apparent from the foregoing that a new and improved drive motor assembly for use in microwave ovens has been provided. While only one presently preferred embodiment has been described in detail, as will be apparent to those familiar with the art, certain changes and modifications can be made without departing from the scope of the invention as defined by the following claims.

We claim:

1. A self-contained drive motor assembly for use interchangeably with different appliances in a microwave oven, comprising a housing reflective to microwave energy defining a microwave-tight enclosure substantially smaller than the oven cavity so that it will not interfere appreciably with the distribution of microwave energy in the cavity when placed therein, a drive motor enclosed within the housing, an output shaft driven by the motor and extending through a microwave attenuating passageway in one wall of the housing, and an output member mounted on the shaft outside and housing for driving engagement with a moveable portion of one of the appliances when the motor assembly is mounted on said appliance, said drive motor assembly being self-contained and freely moveable between the appliances as an integral unit.

2. The drive motor assembly of claim 1 wherein the housing is covered by a shell of electrically insulative material.

3. The drive motor assembly of claim 1 wherein the drive motor is electrically energized.

4. The drive motor assembly of claim 3 further including a battery enclosed within the housing for supplying operating power to the drive motor.

5. The drive motor assembly of claim 3 further including an on/off switch having an operating shaft extending through a second microwave attenuating passageway in a wall of the housing for controlling energization of the drive motor.

6. The drive motor assembly of claim 1 further including a speed reducing transmission enclosed within the housing and interconnecting the drive motor and the output shaft.

7. An independent, self-contained drive motor assembly for use in a microwave oven, comprising a housing having a base plate and a cover of microwave reflective material secured together to form a microwave-tight enclosure substantially smaller than the oven cavity and adapted for placement in a portion of the cavity where it will not interfere appreciably with the distribution of microwave energy within the cavity, an output shaft extending through a microwave attenuating passageway in one wall of the housing, a drive motor enclosed within the housing, a speed reducing transmission within the housing interconnecting the drive motor and the output shaft, a source of energy within the housing, and on/off switch means having an operating shaft extending through a second microwave operating passageway in a wall of the housing for controlling the application of energy from the source to the drive motor.

8. The drive motor assembly of claim 7 wherein the drive motor is electrically energized and the source of energy comprises a battery for supplying operating power to the drive motor.

9. In a drive motor assembly for use in a microwave oven: a housing comprising a base plate and a cover of microwave reflective material secured together to form a microwave-tight enclosure, a rigid shell of electrically insulative material covering the housing cover and projecting beyond the base plate, a drive motor enclosed within the housing, an output shaft driven by the motor and extending through a microwave attenuating passageway in the base plate of the housing, and an output gear mounted on the shaft outside the housing in the region bounded by the base plate and the projecting portion of the insulative shell.

10. The drive motor assembly of claim 9 including a speed reducing transmission interconnecting the drive motor and the output shaft.

11. The drive motor assembly of claim 9 wherein the drive motor is electrically energized.

12. The drive motor assembly of claim 11 further including an on/off switch having an operating shaft extending through a second microwave attenuating passageway in the base plate for controlling energization of the drive motor.

* * * * *